United States Patent [19]

Janes

[11] Patent Number: 5,590,518
[45] Date of Patent: Jan. 7, 1997

[54] HYDROGEN-RICH FUEL, CLOSED-LOOP COOLED, AND REHEAT ENHANCED GAS TURBINE POWERPLANTS

[75] Inventor: Clarence W. Janes, Sacramento, Calif.

[73] Assignee: California Energy Commission, Sacramento, Calif.

[21] Appl. No.: 546,729

[22] Filed: Oct. 23, 1995

Related U.S. Application Data

[63] Continuation-in-part of Ser. No. 182,661, Jan. 12, 1994, Pat. No. 5,490,377, which is a continuation-in-part of Ser. No. 139,525, Oct. 19, 1993, abandoned.

[51] Int. Cl.$^6$ ........................................ F02C 3/28
[52] U.S. Cl. ................... 60/39.12; 60/39.17; 60/39.511
[58] Field of Search ....................... 60/39.04, 39.12, 60/39.17, 39.511, 39.58, 39.59, 728, 736, 744, 745; 415/114

[56] References Cited

U.S. PATENT DOCUMENTS

| | | | |
|---|---|---|---|
| 2,407,166 | 9/1946 | Kreitner et al. | 60/39.17 |
| 2,479,777 | 8/1949 | Price | 60/39.17 |
| 2,625,012 | 1/1953 | Larrecq . | |
| 2,633,707 | 4/1953 | Hermitte et al. . | |
| 2,647,368 | 8/1953 | Treibbnigg et al. | 60/39.17 |
| 3,166,902 | 1/1965 | Maljanian et al. . | |
| 3,785,145 | 1/1974 | Amann . | |
| 3,949,548 | 4/1976 | Lockwood . | |
| 3,969,892 | 7/1976 | Stettler . | |
| 4,182,127 | 1/1980 | Johnson . | |
| 4,765,142 | 8/1988 | Hakhamkin . | |
| 4,858,428 | 8/1989 | Paul . | |
| 4,872,307 | 10/1989 | Nakhamkin . | |
| 4,885,912 | 12/1989 | Nakhamkin . | |
| 5,003,766 | 4/1991 | Paul | 60/39.17 |
| 5,095,693 | 3/1992 | Day . | |
| 5,133,180 | 7/1992 | Horner . | |
| 5,161,365 | 11/1992 | Wright . | |
| 5,313,790 | 5/1994 | Barr . | |
| 5,347,806 | 9/1994 | Nakhamkin . | |

FOREIGN PATENT DOCUMENTS

| | | |
|---|---|---|
| 0150990 | 8/1985 | European Pat. Off. . |
| 15917 | 2/1977 | Japan . |
| 6093132 | 5/1985 | Japan . |
| 851940 | 10/1960 | United Kingdom . |
| 2227796 | 8/1990 | United Kingdom . |
| 2232721 | 12/1990 | United Kingdom . |
| 2264539 | 9/1993 | United Kingdom . |

OTHER PUBLICATIONS

CEC; "Chemically Recuperated Gas Turbine . . . and Reheat" (1992) Gas Turbine World, p. 37.
The HAT Cycle; Electric Power Research Institute; undated.
"Increasing gas turbine efficiency through the use of a waste heat methanol reactor"; Janes, C. W. 1979, Amer. Chem. Society.
"Developments to watch, the next generation of powerplants"; Makansi, J.; Jun. 1990; Power Magazine–vol. 34, No. 6.

Primary Examiner—Louis J. Casaregola
Attorney, Agent, or Firm—John P. O'Banion

[57] ABSTRACT

A gas turbine driven powerplant in which a mixture of steam and a combustible effluent, such as methane, is reformed or partially oxidized to produce a hydrogen-rich fuel which is used to fuel both the primary combustor and a reheat combustor positioned upstream of the final turbine stage, such as the power turbine. Reheat combustion is effected by injecting the hydrogen-rich fuel through the cooling orifices of the first turbine upstream of the final turbine stage and into the gas turbine flow path from the trailing edge of the stationary vanes and/or rotating blades, where the fuel auto ignites with complete combustion occurring at a nominal distance after injection into the air stream. Further, the hydrogen-rich fuel can be used as a coolant for the final turbine stage to allow higher reheat temperatures to be achieved. This reheat design, which will simultaneously provide turbine cooling and supply a reheat fuel that will auto-ignite and burn cleanly, provides the efficiency benefits of reheat without significant or costly redesign of the final turbine stage, and without adding new equipment.

15 Claims, 10 Drawing Sheets

HYDROGEN-RICH FUEL, CLOSED-LOOP COOLED, AND REHEAT ENHANCED GAS TURBINE POWERPLANTS

CROSS-REFERENCE TO RELATED APPLICATIONS

This application is a continuation-in-part of application Ser. No. 08/182,661 filed on Jan. 12, 1994 U.S. Pat. No. 5,490,377, which is a continuation-in-part of application Ser. No. 08/139,525 filed on Oct. 19, 1993, now abandoned.

BACKGROUND OF THE INVENTION

1. Field of the Invention

This invention pertains generally to gas turbine driven powerplants, and more particularly to a gas turbine driven powerplant in which a mixture of steam and methane, or another combustible fuel, is reformed or partially oxidized to produce a hydrogen-rich fuel which is used to fuel both the primary combustor and a reheat combustor. This invention also pertains to use of said fuel, or the steam/combustible feed that becomes said fuel, as turbine coolant in order to allow higher reheat temperatures to be achieved and/or to reduce the need to bleed compressed air for cooling purposes.

2. Description of the Background Art

In GB-A-2232721, published on Dec. 19, 1990, the concept of a chemically recuperated gas turbine ("CRGT") is discussed and certain CRGT designs are presented. However, while that patent discusses the advantages of developing a methane/steam reaction within the exhaust stream of the gas turbine-driven powerplant to produce a hydrogen-rich fuel which can be used to fire the powerplant with low emissions of oxides of nitrogen, it also dismisses much of the advantage as impractical based on cost, efficiency and design considerations. The patent explains that exhaust temperatures required to develop an efficient hydrogen-producing steam/methane reaction (1150° F. to 1800° F.) can only be developed through the use of a reheat combustor and a power turbine designed to withstand temperatures considerably higher than the current capabilities of such turbines. The patent apparently assumes that development of a reheat combustor would be costly based on the development history of flame holders and combustion cans for the primary combustors of existing gas turbine engines. Development of a suitable power turbine for such a cycle is commonly deemed problematic by turbine manufacturers. If one addresses this problem through the traditional approach of bleeding cooling air from the compressors, much or all of the efficiency advantage would likely be lost because the power turbine is larger than the high pressure turbine and requires more air for cooling and/or a lower temperature limit.

The patent goes on to explain that the complexity and expense of developing a reheat combustor and associated power turbine makes it desirable to develop a chemically recuperated gas turbine that avoids this expense and complexity. The patent then describes five embodiments which all avoid the use of a reheat combustor either by the use of a duct burner positioned downstream of the power turbine and upstream of the reformer or by postulation that super-activated catalysts may allow the methane/steam reforming reaction to occur at lower temperatures, minimizing or eliminating the need for duct-firing. However, this problem cannot be resolved by development of new catalysts. The problem is one of thermodynamics, rather than of inadequacy of the catalyst. The chemical equilibrium at lower temperatures is not favorable in that insufficient hydrogen will be produced. Today's catalysts already produce nearly equilibrium compositions, but high temperatures are still required to produce the quantities of hydrogen required to control $NO_x$ and recuperate exhaust heat. The patent goes on to recognize that duct firing reduces efficiency since fuel is consumed by the burner but notes that chemical recuperation increases cycle efficiency and, therefore, even when the burner is utilized the efficiency enhancements obtained through chemical recuperation will at least offset a portion of any efficiency reduction and the system may provide an overall increase in efficiency.

Thus, while GB-A-2232721 teaches the potential advantages of combining chemical reformers with gas turbines, it teaches away from development of reheat combustors and power turbines that can withstand the temperatures typically required to make the chemically recuperated cycle work efficiently. Further, while reheat combustion will increase power output, it also raises the temperatures throughout the power turbine thus requiring a major bleed of cooling air which significantly reduces the net efficiency gains. Therefore, there is a need for a gas turbine driven powerplant which includes a reheat combustor which does not require a flame holder, does not entail the development cost associated with turbine cooling, and which requires little or no modification of existing gas turbine engine technology. The present invention satisfies that need, as well as others, and overcomes the deficiencies in conventional reheat technology.

SUMMARY OF THE INVENTION

In my co-pending application Ser. No. 08/139,525 filed on Oct. 19, 1993 and continued as Ser. No. 08/182,661 filed on Jan. 12, 1994, now U.S. Pat. No. 5,490,377, which is incorporated herein by reference, I explained that in order to effect reheat combustion a hydrogen-rich fuel gas effluent from a reformer could be introduced into the gas turbine flow path from the trailing edge of the stationary vanes and/or rotating blades of the low pressure turbine up stream of the power turbine. Because of the unique combustion characteristics of the hydrogen component, the high temperature of the low-$NO_x$ fuel and the high air temperature, the fuel will auto-ignite with complete combustion occurring at a nominal distance after injection into the air stream and, therefore, a flame holder apparatus is not required. Thus, reheat combustion can be readily accomplished using available stationary vanes and/or rotating blades with their existing internal air cooling passages to also effect metal cooling and, particularly, to convey the low $NO_x$ fuel to the trailing edge injection orifices for injection into the main gas stream, thus ensuring rapid and complete combustion, maximum fuel dilution/mixing, and minimum $NO_x$ generating potential.

Therefore, the hydrogen-rich, low $NO_x$ fuel, which can be created in a reformer or through a partial oxidation process, allows both reheat and turbine cooling to be effected without significant changes to the design of existing gas turbines or adding new equipment. No flame holder apparatus need be designed to withstand the prevailing temperatures because the hydrogen-rich fuel will spontaneously auto-ignite. Where a power turbine is employed, however, this reheat strategy would be limited by the ability of the power turbine to withstand the increased temperatures created by the reheat combustor. Therefore, I propose that a simple, efficient, and effective way to solve this problem is to use the hydrogen-rich, low $NO_x$ fuel or the steam/fuel mixture which is converted to a hydrogen-rich fuel as a coolant for the final turbine stage prior to injection into the gas stream as described above. This is achieved through closed circuit cooling of the power turbine, that is, by routing some or all of the fuel through passages within the power turbine where it will simultaneously cool the metal parts of the power turbine and recover heat from the turbine's metal parts, making combustion of the fuel even more efficient, and then routing the fuel from there to the combustor and/or the reheat combustor.

Closed-loop cooling of turbines is now a well-established practice in advanced combined cycle powerplants where steam developed in the exhaust heat recuperation boiler is routed through turbine parts to simultaneously effect cooling and increase the heat in the steam prior to directing it through a steam turbine cycle. By applying the same approach to the final turbine stage, my unique reheat combustor can develop temperatures approaching the temperatures in earlier stages of the turbine which would allow exhaust temperatures following the final turbine stage to reach levels high enough to effect efficient methane/steam reforming. Thus an aspect of this invention is the combination of (1) the availability of a large volume of hydrogen-rich, low $NO_x$ fuel to effect final turbine stage cooling that allows (2) effective reheat through the use of that same auto-igniting fuel by injection through turbine cooling orifices which, in turn, (3) elevates exhaust temperatures and thus allows the hydrogen-rich, low $NO_x$ fuel to be created in the exhaust stream through the endothermic methane/steam reforming reaction that absorbs heat and returns it to the cycle in the fuel produced by the reformer.

It will be appreciated by those skilled in the art that, while there are clear advantages to creating the hydrogen-rich, low $NO_x$ fuel in a reformer in the exhaust stream, it could also be created through auto-thermal reforming (in which air is injected as the methane and steam flow across the reforming catalyst in order to keep the temperature high enough to produce the desired reformed fuel) or through a process known as partial oxidation which uses a different catalyst. Partial oxidation might be used, for example, with liquid or gaseous fuels that do not readily lend themselves to be reformed in a conventional methane/steam reformer.

Thermodynamic losses in most gas turbine cycles are primarily a function of stack temperature, latent heat of water vapor that flows up the stack, and the amount of excess air (air beyond that which is necessary to effectuate combustion) that flows up the stack. The most efficient cycle would be one that simultaneously minimized stack temperature, used no water for recuperation of heat (or at least allowed no water vapor to escape), and minimized excess air by burning all of the oxygen in the air flow (stoichiometric cycle). Of course, these factors cannot all be achieved at once. Stack temperature is normally decreased through the production of steam whose latent heat is later lost up the stack or in a cooling tower, and thus the goal of minimization of latent heat losses generally runs counter to the goal of minimization of stack temperature. However, as described in my co-pending application referenced above, use of water for recuperation can be minimized by using a two-phased feed of water and methane or water and air to allow vaporization of the water to occur throughout the initial portion of the heat exchange path. By facilitating vaporization, the two-phase feed generates a nonlinear temperature approach to the heating fluid, allowing a significant reduction in the heating surface and reducing thermodynamic irreversibilities. Thus, this invention can be expected to be improved by use of one or more heat exchangers in which a two-phase feed of combustible and water are used to extract as much heat as possible from the exhaust stream, using less water than in traditional boilers and creating a steam/fuel mixture that can be further superheated and/or reformed prior to use in closed circuit cooling and reheat as described above.

In addition to providing this ready opportunity for efficient recuperation of exhaust heat, thus reducing stack temperature with less use of water for that purpose, the present invention also works to reduce thermal losses from the escape of excess air up the stack by approaching or achieving stoichiometric combustion in the reheat combustor. By effectively burning more oxygen out of the air stream through reheat, the invention achieves overall cycle efficiencies that would not be possible in a single-fired gas turbine unless the firing temperature were raised several hundred degrees higher which would present serious problems in effectively cooling turbine parts as well as $NO_x$ control problems. The invention not only avoids these problems by using the hydrogen-rich, low $NO_x$ fuel in the manner described to effect cooling of the power turbine, but may also increase efficiency of the cycle by permitting less air to be bled from the compressor(s) for cooling of turbine hot section components.

An object of the invention is to allow effective reheat in gas turbine engines using existing turbine cooling strategies and without requiring costly development of new reheat combustor equipment.

Another object of the invention is to allow effective reheat in gas turbine engines without significant changes to the design of existing gas turbines or adding new equipment.

Another object of the invention is to employ closed-loop cooling of the power turbine in a steam injected gas turbine cycle in order to permit reheat to temperatures approaching those in the high pressure turbines of such engines.

Another object of the invention is to generate a low-$NO_x$ fuel that will, when burned in a low-$NO_x$ combustor, reduce emissions of $NO_x$ to meet or exceed emission limitations without the use of SCR/ammonia (e.g. generate a hydrogen-rich sulfur free, highly steam diluted fuel).

Another object of the invention is to generate more thermal power (heat release) per mass flow of inlet air to the gas turbine than conventional gas turbine powerplants (i.e. achieve practical levels of oxygen depletion from reheat combustion at temperatures made possible by this invention and from the use of dilute fuels available as a result of this invention).

Another object of the invention is to convert the energy released in the combustion of fuel into shaft work with greater efficiency than conventional gas turbine powerplants (i.e. leave a minimum of residual energy in the stack gas, the only significant source of energy unconverted to shaft work).

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DESCRIPTION OF PREFERRED EMBODIMENTS

Figure 1:
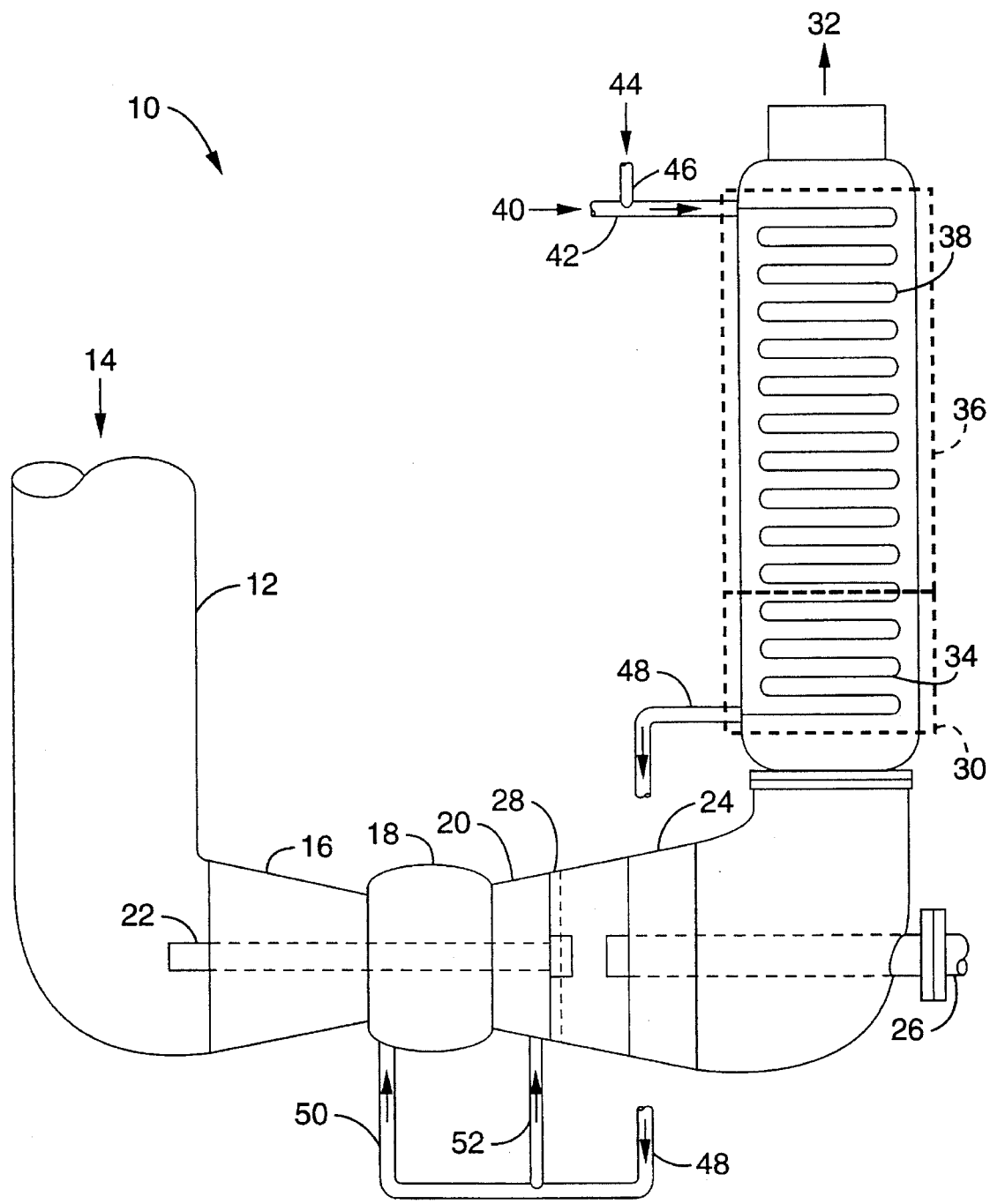
FIG. 1 is a schematic diagram of a gas turbine driven power plant in accordance with the present invention showing a flow of hydrogen-rich fuel to a combustor and reheat combustor wherein the flow of such fuel is generated in a reformer downstream of the final turbine stage and the steam and combustible mixture that feeds the reformer is generated in a once-through boiler located downstream of the reformer.

Referring more specifically to the drawings, for illustrative purposes the present invention is embodied in the apparatus generally shown in FIG. 1 through FIG. 10, where like reference numerals denote like parts. It will be appreciated, however, that the apparatus may vary as to configuration and as to details of the parts without departing from the basic concepts as disclosed herein.

Referring first to FIG. 1, a gas turbine powerplant 10 according to the present invention is shown. Powerplant 10 typically includes a compressor inlet 12 for receiving filtered air 14 for compression, at least one compressor 16 for producing a downstream flow of air, a combustor 18 positioned down stream of compressor 16, at least one turbine 20 positioned downstream of the combustor 18 and mechanically connected to compressor 16 by a shaft 22, and a final turbine 24 positioned down stream of turbine 20 and mechanically connected to a load by a shaft 26. The final turbine 24 may be either a separate power turbine connected only aerodynamically to the last turbine/compressor stage as shown, or it may be the turbine that drives the lowest pressure compressor in a multiple compressor configuration. Those skilled in the art will appreciate that the powerplant configuration described can include additional compressor/turbine stages, and that shaft 26 can be used to power an electrical generator or another form of mechanical load.

In a conventional turbine 20, one or more of the stationary vanes and/or rotating blades contain internal passages through which a coolant can be directed. In the present invention, however, a hydrogen-rich fuel is injected through those internal passages into the main gas stream flow to effect reheat combustion. Not only will the hydrogen-rich fuel act as a coolant for the turbine but, because of the unique combustion characteristics of the hydrogen component as well as the high temperatures of the low-$NO_x$ fuel and air, the fuel exiting the trailing edge of the stationary vanes and/or rotating blades of turbine 20 will auto-ignite, with complete combustion occurring at a nominal distance after injection into the gas stream flowing between turbine 20 and final turbine 24. In this manner, a reheat combustor 28 is created in the flow path between turbine 20 and final turbine 24. It will be appreciated, therefore, that reheat combustion can be readily accomplished using available stationary vanes and/or rotating blades with their existing internal air cooling passages to convey the low $NO_x$ fuel to the trailing edge injection orifices for injection into the main gas stream. This allows the manufacturer to obtain the efficiency benefits of reheat without significant or costly redesign of the final turbine, and without adding new equipment. Also, because the methane/steam reformation reaction is also a function of temperature, this reheat will enhance the chemical recuperation of heat from the exhaust gas stream.

The hydrogen-rich fuel feeding reheat combustor 28 also feeds combustor 18. In the powerplant configuration shown in FIG. 1, the fuel is generated by at least one reformer 30 positioned in the exhaust stream 32 following the final turbine 24. Reformer 30 includes fuel carrying coils 34 over which the hottest portion of the exhaust from final turbine 24 flows, and through which a mixture of combustible hydrocarbon and steam flows, reacting with a catalyst to form the hydrogen-rich effluent that fuels combustor 18 and reheat combustor 28. This mixture of combustible hydrocarbon and steam is generated in at least one heat exchanger 36, which is a conventional once-through boiler or the like. Lower grade heat from exhaust stream 32 which would otherwise escape the cycle flows over fuel carrying coils 38 in heat exchanger 36, converting a mixture of a combustible hydrocarbon 40 such as methane introduced into fuel inlet 42, and water 44 introduced into water inlet 46, into a mixture of combustible hydrocarbon and steam. As can be seen, coils 34 in reformer 30 and coils 38 in heat exchanger 36 are connected in series. It will further be appreciated that the colder end of fuel carrying coils 38 is coupled to the fuel and water inlets, while the hotter end of fuel carrying coils feeds reformer 30 at the colder end of its coils.

Figure 2:
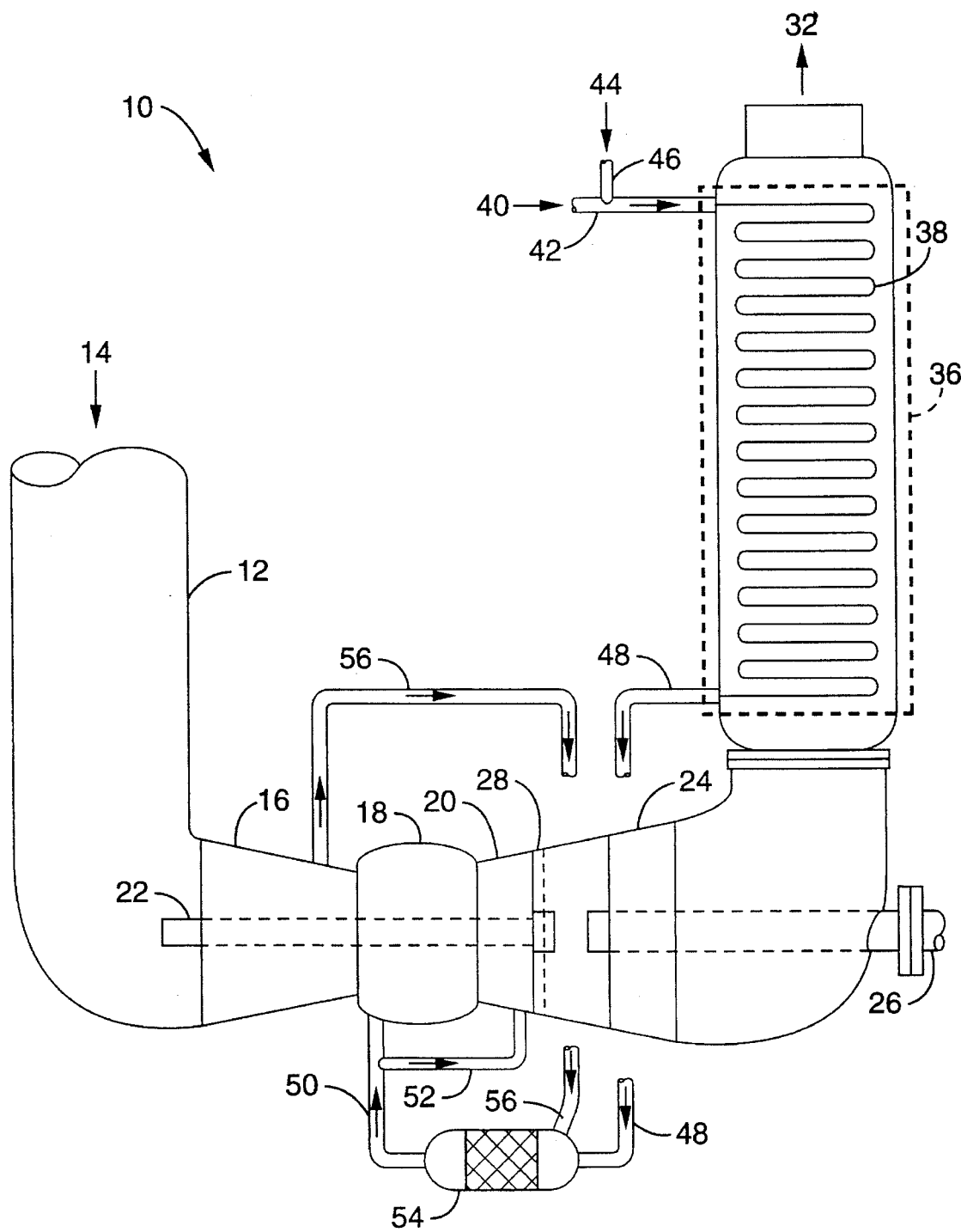
FIG. 2 is a schematic diagram of an alternative embodiment of the gas turbine driven powerplant shown in FIG. 1, in which the flow of hydrogen-rich fuel is generated in an auto-thermal reformer or in a bed of partial oxidation catalyst.

As can further be seen in FIG. 1, the hydrogen-rich fuel (combustible and steam) exits reformer 30 through fuel outlet 48, which is coupled to the output of coils 34, and is directed to combustor 18 through combustor inlet 50 and to reheat combustor 28 through turbine inlet 52. It will be appreciated, however, that instead of using a reformer 30, the hydrogen-rich fuel can be generated in an autothermal reformer 54 located outside the exhaust gas path as shown in FIG. 2, in which case fuel outlet 48 is coupled to the output of coils 38 in heat exchanger 36. Auto-thermal reformer 54 uses the same feed of steam and combustible as shown in FIG. 1, but adds a small flow of air from compressor 16 through air duct 56 in order to burn a portion of the combustible and maintain temperatures that will sustain the hydrogen-producing reaction in the reformer. This configuration is particularly suited where exhaust temperatures are not high enough to sustain that reaction or in any situation in which it is not technically or economically desirable to place a reformer in the turbine exhaust stream.

Those skilled in the art will appreciate that, instead of using an autothermal reformer to produce the hydrogen-rich fuel, a partial oxidation catalyst can be used instead to produce the same hydrogen-rich fuel. This configuration is particularly suited where the primary fuel does not readily produce hydrogen in a steam/combustible reformer or where, for technical or economic reasons, the partial oxidation process is preferred.

Figure 3:
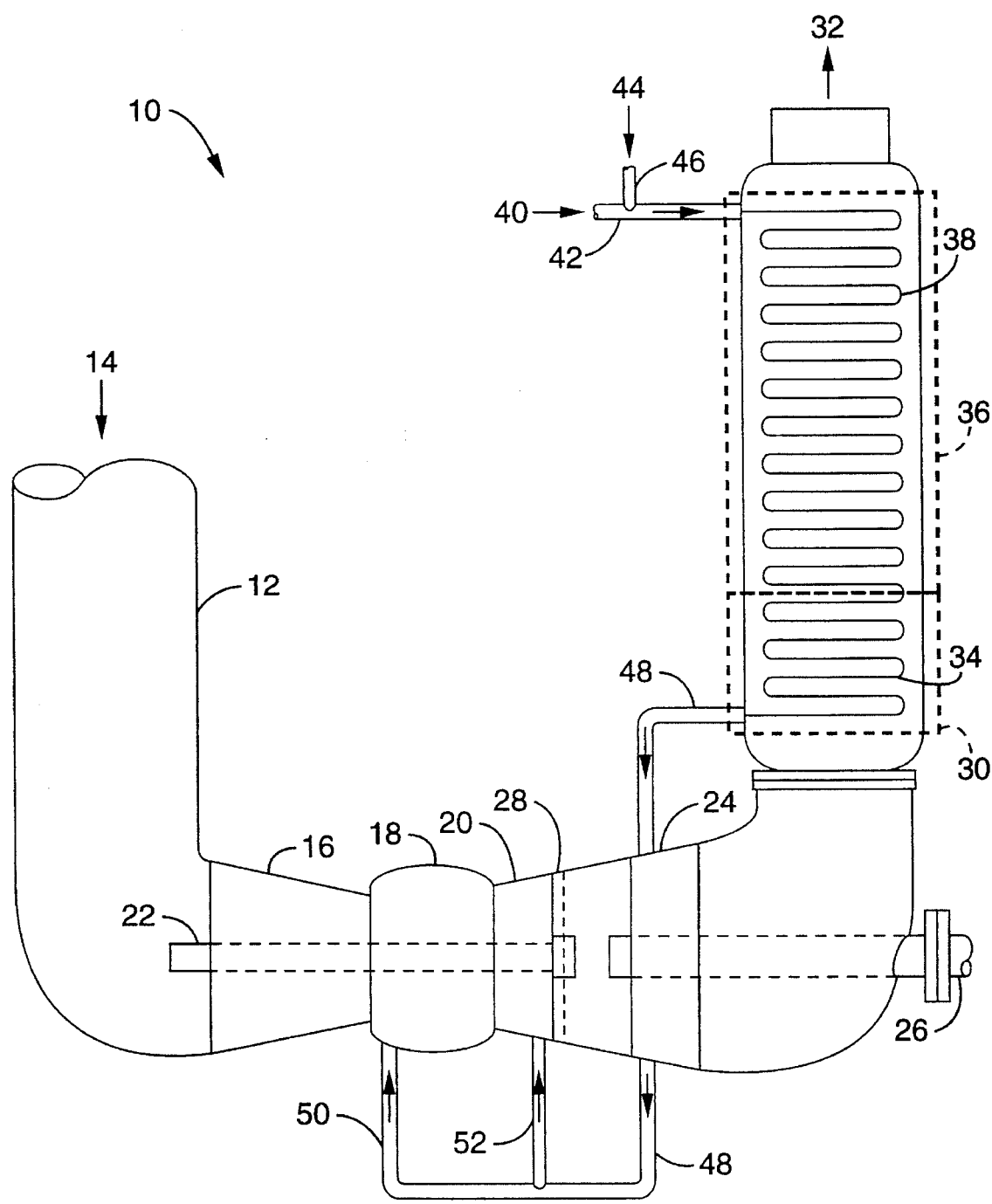
FIG. 3 is a schematic diagram of the gas turbine driven powerplant shown in FIG. 1, in which the flow of hydrogen-rich fuel is first directed through cooling orifices in the final turbine stage prior to being directed to the combustor and the reheat combustor.
Figure 4:
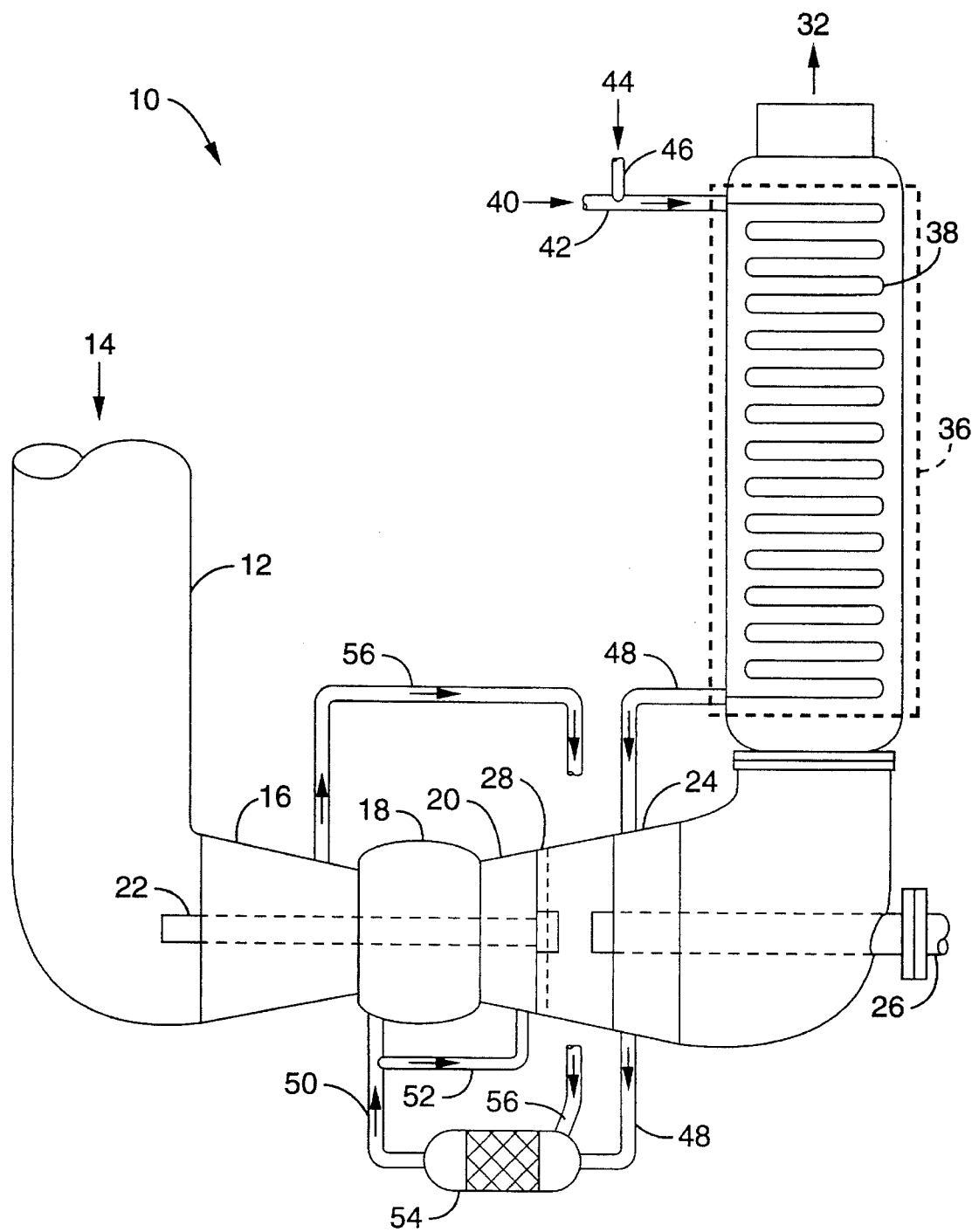
FIG. 4 is a schematic diagram of an alternative embodiment of the gas turbine driven powerplant shown in FIG. 2, in which the flow of steam and combustible that feeds the auto-thermal reformer or bed of partial oxidation catalyst is first directed through cooling orifices in the final turbine stage prior to being directed to the auto-thermal reformer or bed of partial oxidation catalyst.

The amount of reheat that can be achieved using the powerplant designs heretofore described is limited only by the ability of final turbine 24 to withstand the elevated temperatures provided by the reheat combustion. Accordingly, it is desirable to cool the final turbine stage to the extent practicable. In the present invention, this can be achieved by using the hydrogen-rich fuel from reformer 30, or the unconverted steam/combustible mixture fed to autothermal reformer/partial oxidation catalyst 54 from heat exchanger 36, as a coolant for final turbine 24 in a closed-loop cooling configuration as shown in FIG. 3 and FIG. 4, respectively. To do so, final turbine 24 is constructed with internal passages to allow the fuel (steam/combustible mixture) to pass through the metal components of said turbine. Such internal passages can be constructed in a conventional manner as where a coolant is used to cool turbine hot metal components. However, in the present invention, the coolant is not released to the gas path but is recollected with minimal leakage and used as described below.

The hydrogen-rich fuel or the unconverted steam/combustible feed flowing through fuel outlet 48 will be directed through the cooling passages in final turbine 24 to simultaneously effect cooling of the final turbine stage and to return heat from the turbine components to the hydrogen-rich fuel or unconverted steam/combustible feed prior to combustion or conversion. After the hydrogen-rich fuel or unconverted steam/combustible flows through the cooling orifices in final turbine 24, it is directed to combustor 18 and reheat combustor 28 as shown in FIG. 3, or to auto-thermal reformer/partial oxidation catalyst 54 as shown in FIG. 4, in the same manner as shown in FIG. 1 and FIG. 2, respectively.

Figure 5:
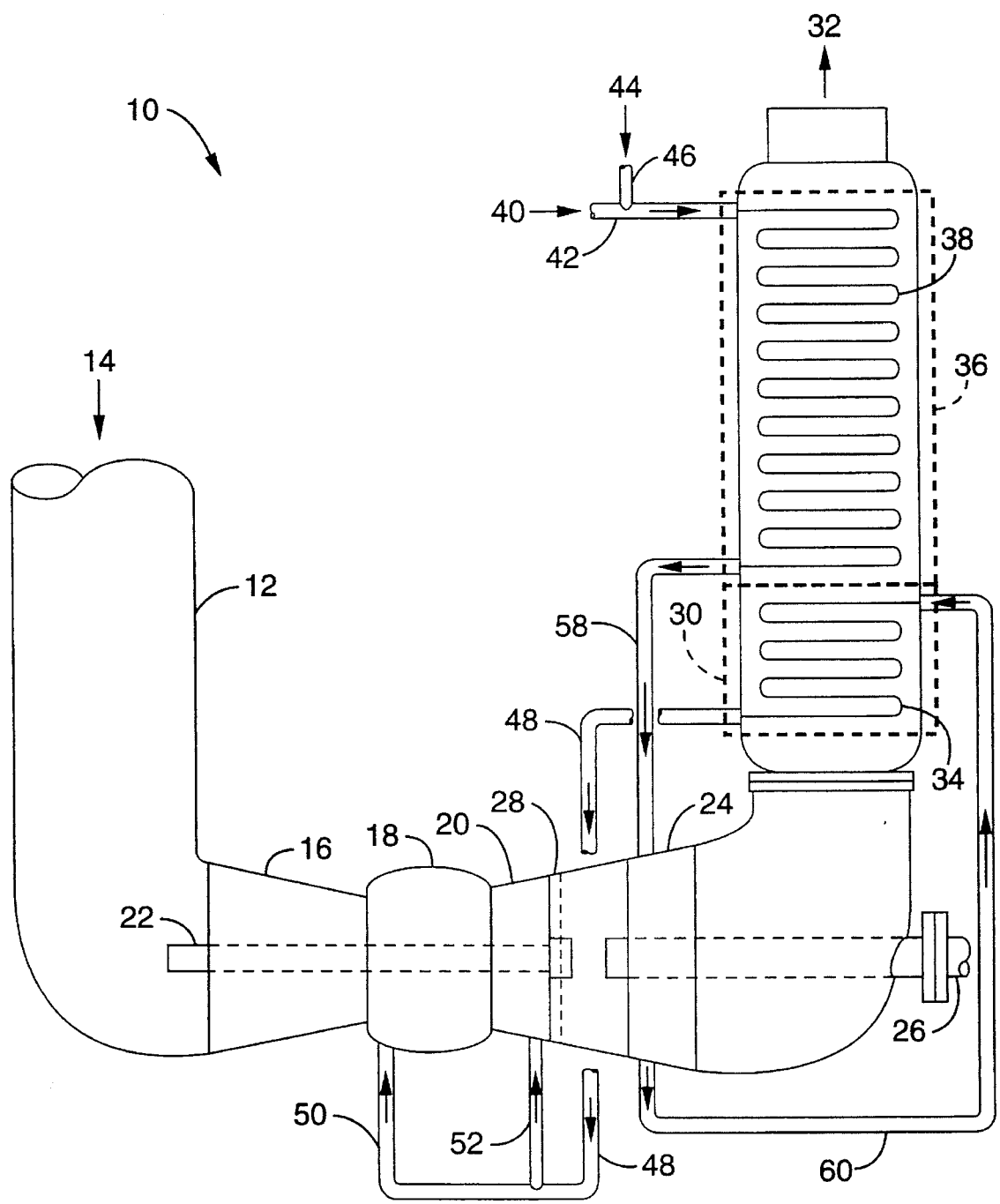
FIG. 5 is a schematic diagram of an alternative embodiment of the gas turbine driven powerplant shown in FIG. 3, in which the flow of steam and combustible that is generated in the once-through boiler is directed through cooling orifices in the final turbine stage prior to being directed to the reformer.

It will be appreciated that, in the powerplant configuration shown in FIG. 4, the unconverted steam/combustible feed from heat exchanger 36 is used for final turbine cooling prior to being converted into a hydrogen-rich fuel for reheat combustion by autothermal reformer/partial oxidation catalyst 54, whereas in FIG. 3 the unconverted steam/combustible feed from heat exchanger 36 is converted to a hydrogen-rich fuel by reformer 30 prior to being used for final turbine cooling. Alternatively, reformer 30 could be used to convert the unconverted steam/combustible feed from heat exchanger 36 to a hydrogen-rich fuel after being used for final turbine cooling as shown in FIG. 5, if a lower temperature fuel/coolant is desired than that which is produced by the configuration shown in FIG. 3. Here, the unconverted steam/combustible feed from heat exchanger 36 is directed to the cooling orifices in final turbine 24 through heat exchanger outlet 58 and is returned to reformer 30 through return line 60.

It will further be appreciated that, when dealing with rotating turbines, there may be slight leakage of fluids which are directed through those turbines. In the configuration shown in FIG. 3, if the hydrogen-rich fuel flowing through the cooling orifices in final turbine 24 were to leak into the main gas stream, it would auto-ignite and provide an additional degree of reheating.

The designs shown in FIG. 3 through FIG. 5 will allow greater reheat combustion to be achieved through the unique reheat strategy described in my co-pending application referenced above, because the final turbine stage will be cooled by the flow of hydrogen-rich fuel or steam/combustible mixture through its internal passages. Further, it is anticipated that the designs of FIG. 3 and FIG. 5 will permit the exhaust temperature following final turbine 24 to be sufficiently high to allow the hydrogen-rich fuel to be formed efficiently in reformer 30, thus taking advantage of the opportunity to chemically recuperate some of the exhaust heat of the cycle, thereby providing for greater efficiency than the configuration shown in FIG. 4.

Referring now to FIG. 6 through FIG. 10, alternative embodiments of the reheat designs corresponding to the configurations of FIG. 1 through FIG. 5, respectively, can be seen. In each of these embodiments, instead of the air flowing from compressor 16 being directed to combustor 18, the air flow enters a heat exchanger 62 through compressed air inlet 64, flows over fuel carrying coils 66, and exits heat exchanger 62 through compressed air outlet 68. Heat exchanger 62 is a conventional once-through boiler or the like, which functions to transfer heat from the flow of air to a mixture of combustible hydrocarbon 70, such as methane introduced into fuel inlet 72, and water 74 introduced into water inlet 76, thereby generating a mixture of combustible hydrocarbon and steam and cooling the flow of air.

The cooled compressed air from heat exchanger 62 flows through air carrying coils 78 in a recuperator 80 and is routed through an air duct 82 which feeds combustor 18. Exhaust gas exiting final turbine 24 flows across air carrying coils, and the heat from the exhaust gas passing over air carrying coils 78 is thereby transferred to and heats the air flowing through those coils. The air is heated to a temperature approaching the temperature of the exhaust gas and is suitable for use as combustion air for combustor 18. Therefore, not only is the cooled air reheated for use as combustion air, but the exhaust gases are cooled before they exit the exhaust stack.

The exhaust gas flow from final turbine 24 is divided between recuperator 80 and the fuel carrying coils 84 of a preheat exchanger 86, respectively. Through mechanical design of recuperator 80 (given expected pressures and volumes of exhaust stream gas and cooled compressed air from the heat exchanger 62), enough of the exhaust gas stream heat will be directed through recuperator 80 to simultaneously bring the cooled compressed air flow from heat exchanger 62 up to a close approach to the temperature of the exhaust gas stream while bringing the temperature of the exhaust gas stream down to a close approach to the temperature of the cooled compressed air exiting heat exchanger 62. The remaining heat contained in the exhaust gas stream is available for use in preheat exchanger 86 which is designed to extract enough of that heat to cool this second portion of the exhaust gas stream to approximately the same pressure and temperature as the portion of the exhaust gas stream exiting recuperator 80. This division of exhaust gas flow into two parallel flows will yield a thermodynamically matched heat exchange regenerator.

Figure 6:
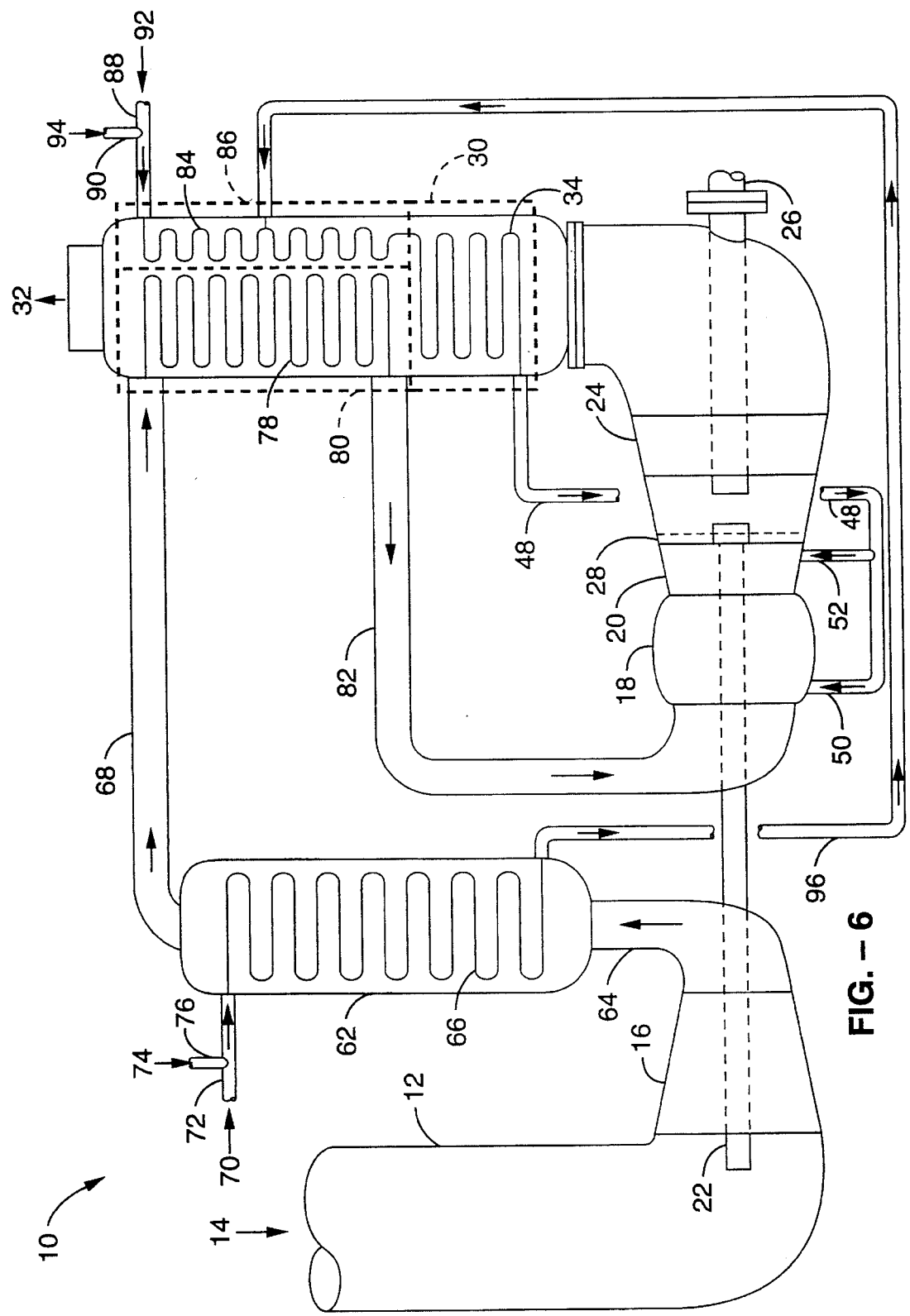
FIG. 6 through FIG. 10 are schematic diagrams of alternative embodiments of the gas turbine driven powerplants shown in FIG. 1 through FIG. 5, respectively, in which a heat exchanger is positioned downstream of the compressor, a recuperator is positioned downstream of the heat exchanger and downstream of the final turbine stage, the combustor is positioned downstream of the recuperator, a preheat exchanger is positioned downstream of the final turbine stage, and the exhaust stream is divided between the recuperator and the preheat exchanger.

Referring specifically to FIG. 6, reformer 30 is positioned downstream from power turbine 24 and the entire exhaust gas stream flows over the fuel carrying coils 34 in the same manner as in FIG. 1. Down stream of reformer 30, however, the partially cooled exhaust gas flow from final turbine 24 is mechanically divided between recuperator 80 and preheat exchanger 86, respectively. Division of the exhaust gas flow is accomplished in the same manner as described above.

Preheat exchanger 86 is a conventional once-through boiler or the like. The cooler end of fuel carrying coils 84 of preheat exchanger 86 is coupled to fuel inlet 88 and water inlet 90; the hotter end is coupled to coils 34 of reformer 30. A combustible hydrocarbon 92 such as methane is introduced into fuel inlet 88, while water 94 is introduced into water inlet 90. As a result of heat transferred from the exhaust gas, the mixture is convened to a mixture of combustible hydrocarbon and steam as it flows through fuel carrying coils 84. In addition, fuel outlet 96 of heat exchanger 62 is coupled to the approximate midpoint of coils 84 in preheat exchanger 86. Accordingly, the mixture of combustible hydrocarbon and steam generated by heat exchanger 62 is introduced into the fuel carrying coils 84 of preheat exchanger 86 and further heated. In this manner, two flows of a mixture of combustible hydrocarbon and steam pass through preheat exchanger 86 and feed reformer 30.

It will be appreciated, therefore, that heat exchanger 62 serves as a first preheat exchanger to increase the fuel temperature prior to reforming and, further, serves to cool the compressor discharge air. By doing so, use of a recuperator to return the majority of exhaust heat to the cycle in the compressed air flow is permitted. This design can be expected to produce higher plant efficient where exhaust temperatures entering the recuperator are significantly higher than the temperature of the compressed air exiting the compressor. Heat exchanger 62 and preheat exchanger 86 together perform the same function as heat exchanger 36 shown in the configurations of FIG. 1 through FIG. 5, creating a flow of steam and combustible ready for reforming or partial oxidation conversion to a hydrogen rich fuel and lowering stack temperature with minimum practical use of water in order to reduce latent heat losses. The hydrogen-rich combustible effluent from reformer 30 is then fed to combustor 18, as well as to reheat combustor 28 through the cooling orifices in turbine 20, via fuel outlet 48.

Figure 7:
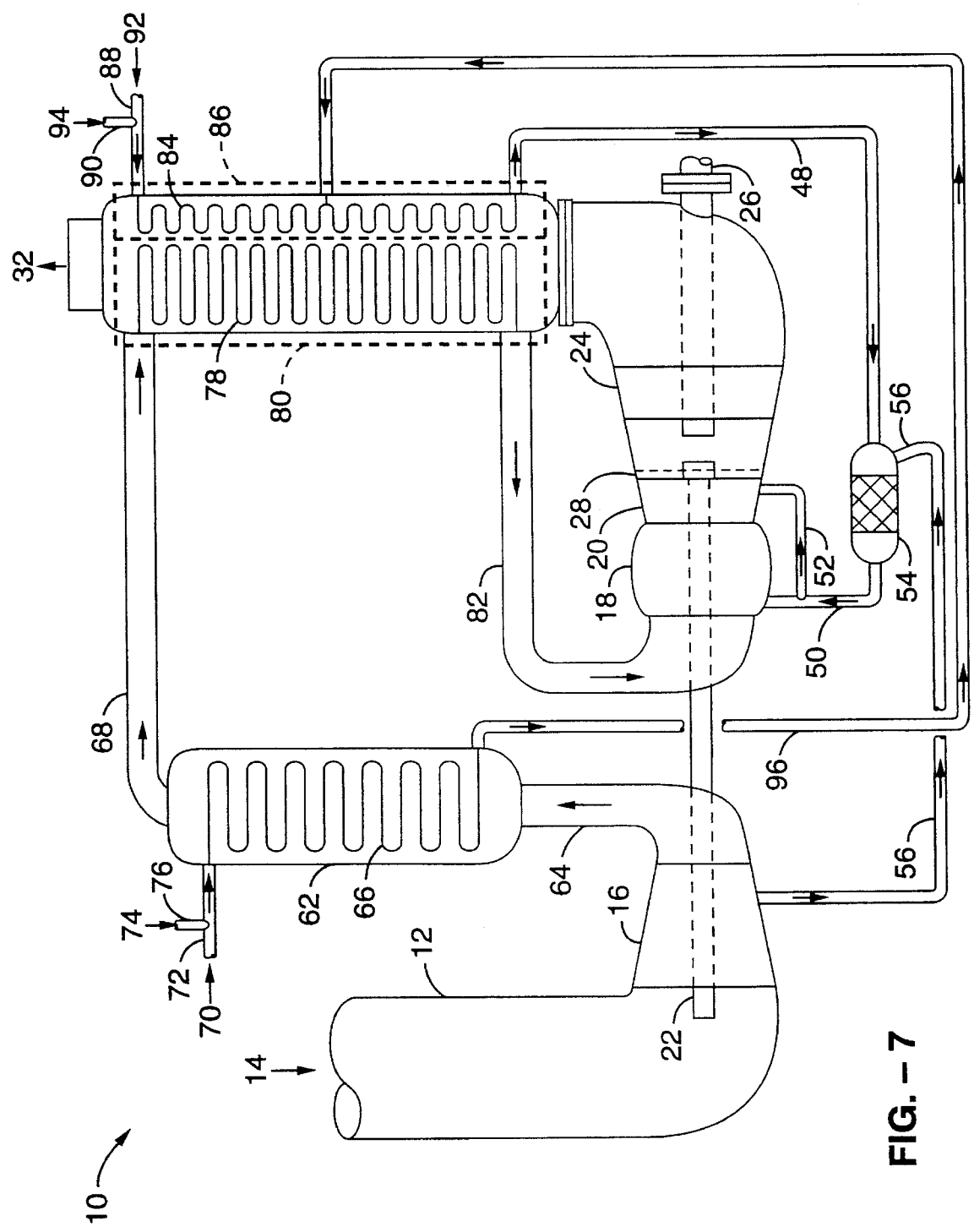
Figure 8:
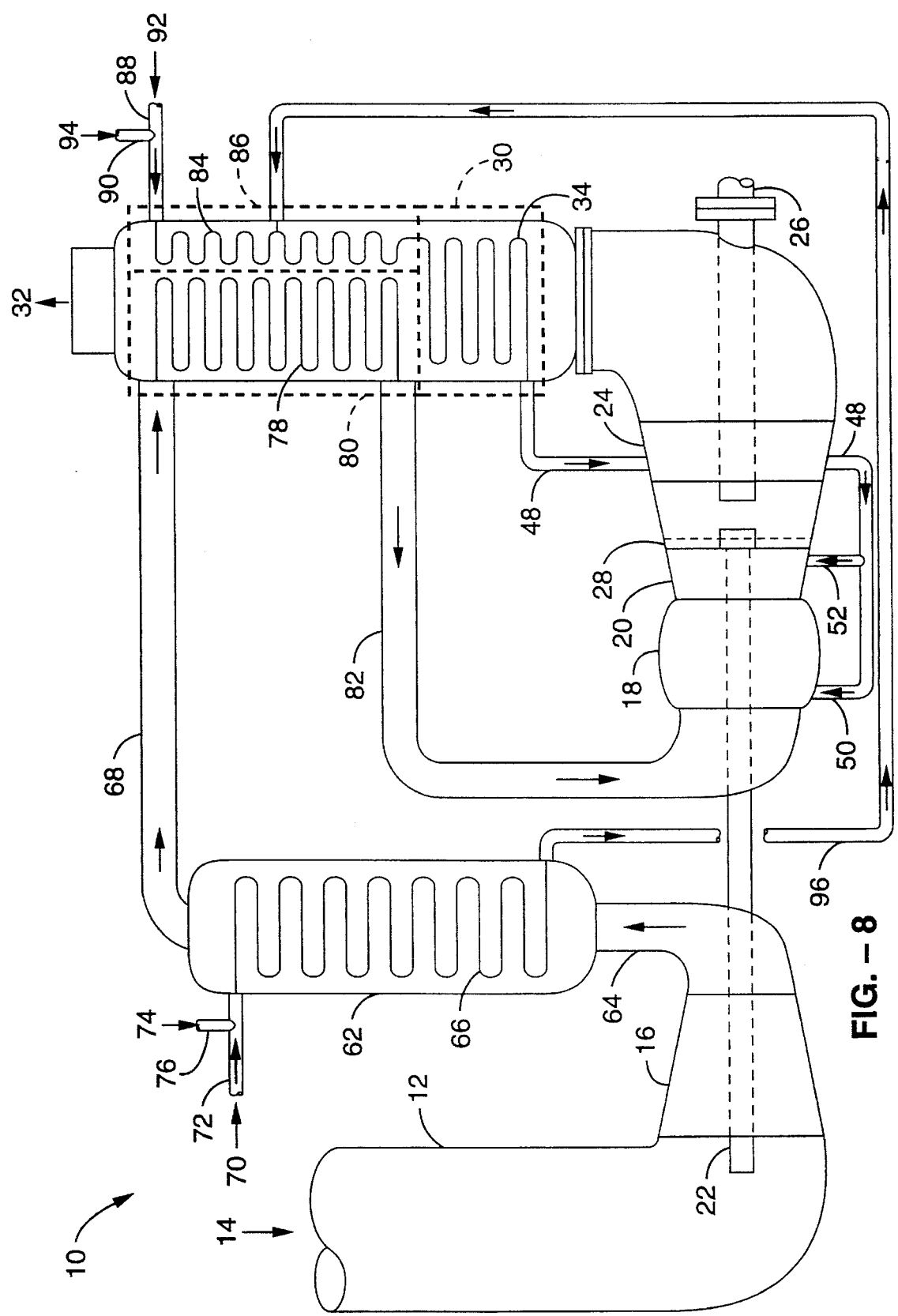
Figure 9:
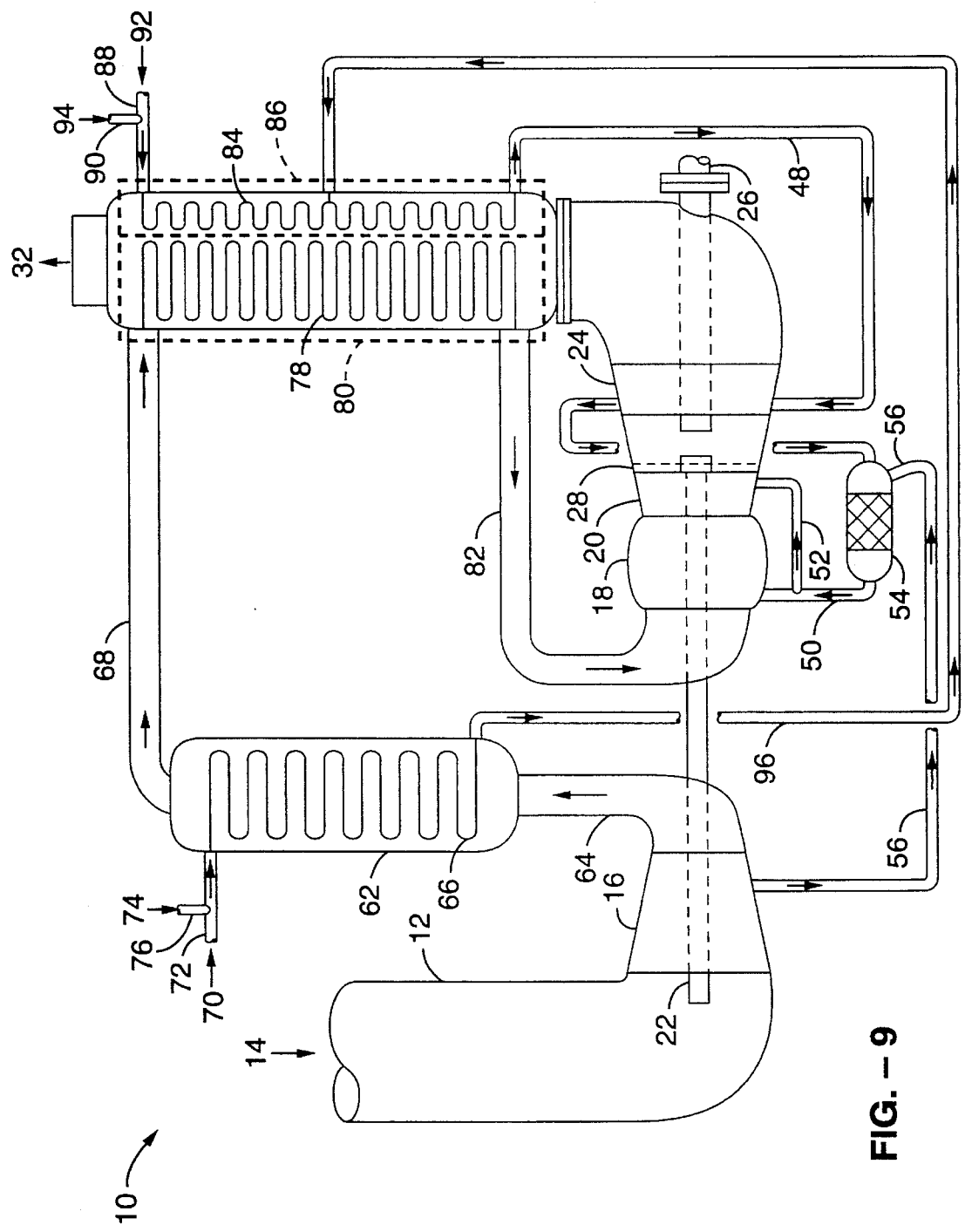
Figure 10:
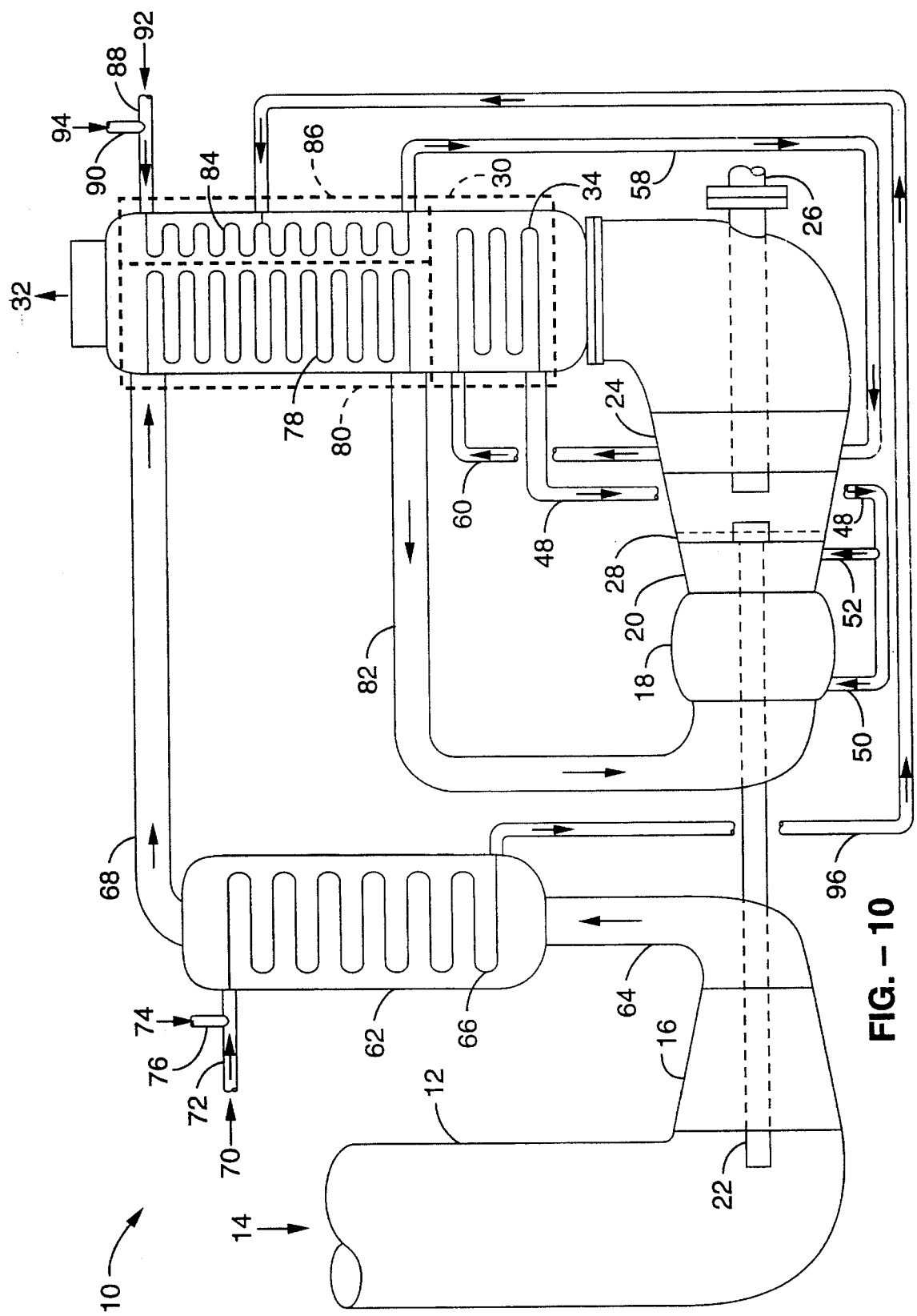

Referring also to FIG. 7, it will be appreciated that reformer 30 could be eliminated if desired and, instead, the hydrogen-rich fuel needed for reheat combustion could be generated by an autothermal reformer/partial oxidation catalyst 54 in the same manner as described with reference to FIG. 2 above. Further, referring to FIG. 8 and FIG. 9, the hydrogen-rich fuel (FIG. 8) or unconverted steam/combustible mixture (FIG. 9) can be used for cooling final turbine 24 if desired as described with reference to FIG. 3 and FIG. 4 above. Also, as shown in FIG. 10, it will be appreciated that reformer 30 could be used to convert the unconverted steam/combustible feed from preheat exchanger 86 to a hydrogen-rich fuel after being used for final turbine cooling in the manner described with reference to FIG. 5 if a lower temperature fuel/coolant is desired than that which is produced by the configuration shown in FIG. 8.

Although the description above contains many specificities, these should not be construed as limiting the scope of the invention but as merely providing illustrations of some of the presently preferred embodiments of this invention. It will further be appreciated that the invention presented herein can be incorporated into many alternative powerplant designs. Thus the scope of this invention should be determined by the appended claims and their legal equivalents.

What is claimed is:

1. A gas turbine driven powerplant, comprising:
   (a) compressor means for producing a downstream flow of air;
   (b) a combustor positioned downstream of said compressor means;
   (c) a first turbine positioned downstream of said combustor, said turbine coupled to said compressor by a shaft;
   (d) a reheat combustor positioned downstream of said turbine; and
   (e) a second turbine positioned downstream of said reheat combustor;
   (f) said reheat combustor receiving a flow of hydrogen-rich fuel through cooling orifices in said first turbine, wherein said hydrogen-rich fuel auto-ignites upon discharge from said cooling orifices into the flow of air from said first turbine to said second turbine.

2. A gas turbine driven powerplant as recited in claim 1, further comprising:
   (a) heat exchanger means for producing a mixture of combustible hydrocarbon and steam, said heat exchanger means positioned downstream of said compressor means;
   (b) a recuperator positioned downstream of said heat exchanger, upstream of said combustor, and downstream of said second turbine; and
   (c) a preheat exchanger positioned downstream of said second turbine;
   (d) wherein exhaust gases from said second turbine are divided between said recuperator and said preheat exchanger.

3. A gas turbine driven powerplant as recited in claim 1, further comprising heat exchanger means for producing a mixture of combustible hydrocarbon and steam, said heat exchanger means positioned downstream of said second turbine.

4. A gas turbine driven powerplant as recited in claim 3, further comprising fuel conversion means for producing said flow of hydrogen-rich fuel from said mixture of combustible hydrocarbon and steam.

5. A gas turbine driven powerplant as recited in claim 1, wherein said hydrogen-rich fuel flows through cooling orifices in said second turbine.

6. A gas turbine driven powerplant as recited in claim 3, wherein said mixture of combustible hydrocarbon and steam flows through cooling orifices in said second turbine.

7. A gas turbine driven powerplant as recited in claim 4, wherein said heat exchanger means comprises a heat exchanger, said heat exchanger including a fuel carrying coil, said fuel carrying coil having a colder first end coupled to a fuel inlet and a water inlet, said fuel carrying coil having a hotter second end coupled to said fuel conversion means.

8. A gas turbine driven powerplant as recited in claim 7, wherein said fuel conversion means comprises a reformer positioned downstream of said second turbine and upstream of said heat exchanger, said reformer including a second fuel carrying coil, said second fuel carrying coil having a colder first end coupled to hotter second end of said fuel carrying coil in said heat exchanger, said second fuel carrying coil having a hotter second end coupled to said combustor and said cooling orifices in said first turbine.

9. A gas turbine driven powerplant as recited in claim 7, wherein said fuel conversion means comprises an autothermal reformer positioned between said hotter second end of said fuel carrying coil in said heat exchanger, and said combustor and said cooling orifices in said first turbine.

10. A gas turbine driven powerplant as recited in claim 7, wherein said fuel conversion means comprises an oxidation catalyst positioned between said hotter second end of said fuel carrying coil in said heat exchanger, and said combustor and said cooling orifices in said first turbine.

11. A gas turbine driven powerplant, comprising:

(a) a compressor means for producing a downstream flow of air;

(b) a combustor positioned downstream of said compressor means;

(c) a first turbine positioned downstream of said combustor, said turbine coupled to said compressor by a shaft;

(d) a reheat combustor positioned downstream of said turbine, said reheat combustor receiving a flow of hydrogen-rich fuel through cooling orifices in said first turbine, wherein said hydrogen-rich fuel auto-ignites upon discharge from said cooling orifices into the flow of air from said first turbine toward a second turbine;

(e) said second turbine positioned downstream of said reheat combustor;

(f) a heat exchanger positioned downstream of said second turbine, said heat exchanger including a fuel carrying coil, said fuel carrying coil coupled to a fuel inlet and a water inlet; and (g) fuel conversion means for producing said hydrogen-rich fuel from a mixture of combustible hydrocarbon and steam received from said fuel carrying coil and delivering said hydrogen-rich fuel to said combustor and to said cooling orifices in said first turbine.

12. A gas turbine driven powerplant as recited in claim 11, wherein said hydrogen-rich fuel flows through cooling orifices in said second turbine.

13. A gas turbine driven powerplant as recited in claim 11, wherein said fuel conversion means comprises a reformer positioned downstream of said second turbine and upstream of said heat exchanger, said reformer including a second fuel carrying coil, said second fuel carrying coil having a first end coupled to said fuel carrying coil in said heat exchanger, said second fuel carrying coil having a second end coupled to said combustor and said cooling orifices in said first turbine.

14. A gas turbine driven powerplant as recited in claim 11, wherein said fuel conversion means comprises an autothermal reformer positioned between said fuel carrying coil and said combustor and said cooling orifices in said first turbine.

15. A gas turbine driven powerplant as recited in claim 11, wherein said fuel conversion means comprises an oxidation catalyst positioned between said fuel carrying coil and said combustor and said cooling orifices in said first turbine.

* * * * *